United States Patent [19]
Fredricks

[11] Patent Number: 5,668,675
[45] Date of Patent: Sep. 16, 1997

[54] OPTO-ELECTRONIC AID FOR ALIGNMENT OF EXTERIOR VEHICLE MIRRORS TO MINIMIZE BLIND SPOT EFFECTS

[76] Inventor: Ronald J. Fredricks, 2046 Foxboro, NW., Grand Rapids, Mich. 49504

[21] Appl. No.: 374,220

[22] Filed: Jan. 18, 1995

[51] Int. Cl.⁶ .................. G02B 5/08; B60R 1/06
[52] U.S. Cl. .......... 359/843; 359/838; 359/839; 359/872; 359/877; 362/83.1
[58] Field of Search .............. 359/838, 839, 359/840, 843, 850, 855, 856, 857, 865, 872, 877; 362/83.1

[56] References Cited

U.S. PATENT DOCUMENTS

| | | | |
|---|---|---|---|
| 2,871,761 | 3/1959 | Snyder | 88/86 |
| 3,493,294 | 2/1970 | Fitzmaurice et al. | 350/285 |
| 4,019,812 | 4/1977 | Carnine | 350/304 |
| 4,187,001 | 2/1980 | Redwitz et al. | 350/202 |
| 4,267,494 | 5/1981 | Matsuoka et al. | 318/568 |
| 4,318,590 | 3/1982 | Hanley | 350/289 |
| 4,345,819 | 8/1982 | Villa-Real | 350/304 |
| 4,349,247 | 9/1982 | Koyama et al. | 350/302 |
| 4,439,013 | 3/1984 | Hagn et al. | 350/307 |
| 4,575,202 | 3/1986 | McGuire | 350/627 |
| 4,625,329 | 11/1986 | Ishikawa et al. | 382/1 |
| 4,727,302 | 2/1988 | Mizuta et al. | 318/567 |
| 4,730,926 | 3/1988 | Wedemeyer | 356/153 |
| 4,792,220 | 12/1988 | Janowicz | 350/637 |
| 4,906,085 | 3/1990 | Sugihara et al. | 350/601 |
| 4,938,577 | 7/1990 | Sugita | 350/605 |
| 4,962,998 | 10/1990 | Iino | 350/174 |
| 4,971,430 | 11/1990 | Lynas | 350/605 |
| 4,986,646 | 1/1991 | Hammamoto et al. | 350/637 |
| 5,014,167 | 5/1991 | Roberts | 362/83.1 |
| 5,022,747 | 6/1991 | Polanyi et al. | 359/872 |
| 5,033,835 | 7/1991 | Platzer Jr. | 350/637 |
| 5,037,182 | 8/1991 | Groves et al. | 359/839 |
| 5,056,905 | 10/1991 | Jensen | 359/843 |
| 5,122,910 | 6/1992 | Polanyi et al. | 359/865 |
| 5,126,885 | 6/1992 | Gray | 359/843 |
| 5,207,492 | 5/1993 | Roberts | 362/30 |
| 5,237,458 | 8/1993 | Polanyi et al. | 359/839 |
| 5,313,335 | 5/1994 | Gray et al. | 359/839 |

OTHER PUBLICATIONS

"Principles of Rotary Optical Encoders", Sensors, Apr. 1993, pp. 10–18.

*Primary Examiner*—Ricky D. Shafer
*Attorney, Agent, or Firm*—Joseph F. Breimayer

[57] ABSTRACT

An opto-electronic alignment method and apparatus capable of being incorporated into left and right side vehicle exterior sideview mirrors to assist the driver in adjusting the mirror to minimize the presence of any traffic blind spot on a side of the vehicle. In a first embodiment, an LED is fixed in the mirror housing and aimed at the particular vehicle blind spot but reflected at an angle through a selectively light transmissive mirror region toward the vehicle interior. The sideview mirror alignment is accomplished by the driver using a conventional mirror adjustment control. When the driver sees the beam of light, the main sideview mirror is oriented correctly to reflect objects in the blind spot to the driver's eyes. In a second embodiment, the LED is mounted for pitch and azimuth adjustment using the adjustment control. When the driver sees the beam of light, the positional coordinates of the light emitting source are employed by a microcomputer to derive positional coordinates for the correct sideview mirror orientation to enable reflection of objects in the blind zone into the driver's eyes. The sideview mirror is then moved to the positional coordinates by servo motors. In either embodiment, the driver's preferred mirror alignments and other driver adjustable vehicle operating conditions may be memorized with the mirror position coordinates and a driver ID code so that the mirror positions may be readjusted, if necessary, when the driver ID code is entered.

8 Claims, 5 Drawing Sheets

OPTO-ELECTRONIC AID FOR ALIGNMENT OF EXTERIOR VEHICLE MIRRORS TO MINIMIZE BLIND SPOT EFFECTS

BACKGROUND OF THE INVENTION

1. Field of the Invention

The present invention relates to an opto-electronic alignment apparatus capable of being incorporated into left and right side vehicle exterior sideview mirrors to assist the driver in adjusting the mirrors to minimize the presence of any traffic "blind spots" or "blind zones" on either side of the vehicle.

2. Description of the Background Art

Passenger and commercial vehicles, e.g. automobiles and light trucks, are typically provided with an interior rearview mirror and exterior left and right side view mirrors with which the vehicle driver can view traffic to the sides and rear of the vehicle within certain fields of view dictated by the positioning of the mirrors. Typically, the interior rearview mirror can be manually adjusted about horizontal and vertical axes through its mount to the headliner or windshield to provide corresponding pitch and azimuth angle adjustment of the view through the vehicle rear window. Even when properly adjusted, the bordering structure of the rear window limits the view to either side. Consequently, vehicles are provided with left and right exterior rearview or sideview mirrors that are typically mounted at the junctures of the left and right windshield pillars with the adjacent front seat side windows. Mechanical or electro-mechanical, remote joystick controls are provided to allow the driver to adjust the sideview mirrors for azimuth (side to side about a vertical axis) and pitch (up and down about a horizontal axis perpendicular to the longitudinal axis of the vehicle). Improper adjustment of the sideview mirrors, particularly in azimuth angle results in wide blind zones or spots on either side of the vehicle.

Such blind zones or spots are widely described and depicted as shown, for example, in the FIGS. 1 and 4 of U.S. Pat. No. 5,033,835, incorporated by reference in its entirety. The blind zones on either side generally subtend an azimuth arc angle between the limits of the driver's peripheral vision while looking ahead and the left and right limits of the fields of view of the left and right sideview mirrors when the mirrors are aimed along the vehicle sides and a pitch angle generally bisected by the horizon. The blind zones are really cone-shaped tunnel areas expanding outward from the sides of the vehicle slightly downward from the eye level of the driver and away from the vehicle sides. Customarily, these right and left blind zones are referred to as blind spots, and that term will be used hereafter.

The current method of exterior sideview mirror alignment used on virtually all domestic and imported passenger vehicles simply relies on the driver's judgment as to the proper imagery he/she should see reflected by the sideview mirror. This is supposedly gained by experience with different settings. The vast majority of drivers erroneously believe that correct azimuth angle alignment is achieved when the side panels of their own vehicle are reflected back to them along one edge of the exterior sideview mirrors when they are in their normal driving position. This belief apparently arises from improper instruction during driver training or experience with older vehicles where the sideview mirrors were mounted forward on the fenders of the vehicle and reflected a wider field. It is also somewhat intuitive, albeit usually incorrect, to assume that this setting captures the entire view that cannot be seen through the inside rearview mirror.

After making this static adjustment, sooner or later, drivers experience an actual or near collision with vehicles in adjacent traffic lanes travelling in the blind spots. Through this experience, most people come to appreciate that there are left and right blind spots, but believe that the sideview mirrors are incapable of being adjusted to the correct setting. Instead, they crane their heads for a split second to look into the blind spot lane they intend to move into to make sure it is clear of traffic, distracting them from traffic ahead. The sideview mirrors become useless ornaments, and the distraction can cause rear end collisions.

To make matters worse, for styling and other reasons, sideview mirrors are frequently under-sized, do not extend outwardly of the vehicle sufficiently, and are positioned too close to the driver to allow a wide enough azimuth angle to be obtained in the assumed correct position. Even with these limitations, however, it is usually possible to correctly adjust the sideview mirrors to reflect back an image in the blind spot of a vehicle in an adjacent lane. The correct settings allow a driver to see overtaking vehicles in both adjacent lanes enter the sideview mirror images as they leave the rearview mirror image and remain in the sideview mirror image until they can be seen in the peripheral vision of the driver. Unfortunately, most drivers do not appreciate this dynamic manner of properly adjusting mirror settings, assuming that the sideview mirrors meet minimal size and positioning standards.

Frequently, two or more individuals may drive the same vehicle. While the interior rearview mirror may get readjusted by each driver, there is frequently no readjustment of the exterior sideview mirrors, even though a different driver is now controlling the vehicle. And, if one driver does adjust the sideview mirrors to his/her liking, the other should go through the same process but, typically, will forget to do so. The adjustments that are typically made by different drivers are pitch about the horizontal axis depending on the drivers' height or the pitch and azimuth, if the driver changes the seat height or distance from the steering wheel. In certain vehicles having memorized driver seat positions, the mirror pitch and azimuth positions are memorized with the seat positions as shown, for example, in U.S. Pat. Nos. 4,267,494, 4,625,329 and 4,727,302. Such systems do not necessarily provide the optimum position for eliminating blind spots, but instead rely on the drivers to make the initial settings that are memorized.

These problems with correctly aligning sideview mirrors to eliminate or minimize blind spots have attracted a great deal of attention at least in the patent literature as evidenced by the above-incorporated '835 patent. The '835 patent provides an auxiliary mirror built into a corner of the sideview mirror which images a reference point on the vehicle side to which the mirror is mounted when the main mirror is properly aligned to image the vehicle blind spot. In another form, the sideview mirror is first adjusted by the driver to image the reference point, and then the electro-mechanical system changes the alignment a preset amount to image the blind spot. A lamp on the adjustment mechanism lights when the final alignment position is achieved by the system.

The problem with the above approach is that having an auxiliary mirror on the front surface of the main mirror reduces the area for viewing blind spot obstructions. Also, the required target on the side of the vehicle may not always be clearly visible due to road grime on the vehicle or simply because of low ambient lighting. Finally, salient auxiliary mirrors and targets on the side of the vehicle large enough to be seen by the driver are anathema to automotive stylists.

Both wide viewing angle, static mounted, mirrors and dynamically movable sideview mirrors are the subjects of other patents, e.g. U.S. Pat. Nos. 4,019,812, 4,187,001, 4,318,590, 4,439,813, 4,575,202, 4,792,220 and 4,971,930. All of these proposed solutions require either bulky assemblies, distort the image in the field of view so that the driver does not see all the potential safety hazards in correct prospective, or are complex electro-mechanical systems with intermittent or continuously running motors and subsequent noise and vehicle power drain.

In addition, it has been proposed to alert the oncoming driver in the blind spot to the intention of the blinded driver to make a turn or lane change by adding turn signal indicators to the sideview mirror structure as disclosed, for example, in U.S. Pat. Nos. 4,906,085, 5,014,167 and 5,207,492. These forward mounted, auxiliary turn signals may alert an overtaking driver in the adjacent lane too late to be totally effective, and may even encourage the failure of drivers to properly set their sideview mirror azimuth angles. Moreover, due to their fields of view, if the sideview mirrors are not properly adjusted in the first place, the turn signals may not be seen by an overtaking vehicle.

The annual cost of side impact collisions in the United States caused by inappropriate turns or lane changes, exclusive of pain and suffering, has been estimated to be in the half billion dollar range by one major midwest based insurance company. Many of these accidents could be prevented with a simple aid for left and right sideview mirror alignments to embrace the blind spots peculiar to each vehicle model in the reflected images seen by the driver.

To be adapted by vehicle manufacturers, such an aid must be inexpensive, reliable, consume minimal power, and be able to be incorporated into a new or existing mirror housing subject to whatever styling considerations are imposed. To be accepted by the driving public, the aid must be simple to operate and not impact the cost of the sideview mirror system substantially. To be of practical value to the general public, the aid must inherently compensate, at least approximately, for variations in driver height and seat position. This inherent compensation should be automatic and occur as the vehicle operator uses the aid's optical cues during mirror alignment. Moreover, when used, the aid should provide positive feedback to the driver that assures him/her that the alignment is correct, even if it appears to the driver to be incorrect. These goals are all met with the embodiments of the present invention described in detail hereafter.

SUMMARY OF THE INVENTION

Therefore, it is a first object of the present invention to provide an improved, opto-electronic based, aid for alignment of automotive exterior sideview mirrors to minimize blind spot effects.

A further object of the present invention is to provide such an opto-electronic aid which may be manufactured and installed as original equipment on automotive vehicles or the like, or which may further be manufactured in the manner of a retrofit for the vehicle after market.

Another object of the present invention is to provide an opto-electronic exterior sideview mirror alignment aid which is readily adaptable to most all automobile and truck models having different blind spot regions.

Yet another object of the present invention is to provide the automotive driver with a visual cuing signal emanating from the sideview mirror, capable of indicating when proper alignment of the mirror in question is achieved.

An additional object of the present invention is to, at least approximately, automatically compensate for any differences in driver height and driver fore-aft seat position.

A further additional object of the present invention is to automatically indicate to the driver an out-of-alignment condition at vehicle start-up or anytime the vehicle is in operation by the driver touching an appropriate switch.

Still another object of the present invention is to allow the opto-electronic exterior sideview mirror alignment aid to be fully integrated with most existing sideview mirrors, so that no substantial mirror styling changes have to be made in order to accommodate the alignment aid function.

The preceding objects are realized in a simple, first embodiment of this invention, with manual or semiautomatic alignment of the actual mirror performed by the vehicle operator, and a second embodiment of this invention, featuring fully automatic alignment of the actual mirror surface after the driver is finished making angular adjustments to an alignment light beam. The first embodiment requires no look-up tables and/or mathematical computations and hence does not inherently need a microprocessor or microcomputer (hereinafter, the term "microcomputer", including memory storage and input/output circuits, will be used for all embodiments preferably employing a microprocessor or equivalent logic circuits). Instead, the driver makes the actual adjustment of the driver's sideview mirror either manually via appropriate mechanical linkages or semiautomatically (as in a conventional motorized or power mirror).

In the most basic form of the first embodiment, the microcomputer is also unnecessary to make the adjustment in alignment of the passenger's side exterior sideview mirror. Rather, the passenger's side mirror is equipped with the necessary hardware so that the driver can make the same manual or semiautomatic adjustments as performed on the driver's side mirror. However, as described more fully below, even in this first embodiment of the invention, an on-board microcomputer may be employed for automatic adjustment of the passenger side exterior sideview mirror and to memorize alignment settings for both exterior sideview mirrors for future use.

The second, more sophisticated, embodiment of this invention employs an integrated microcomputer which is programmed to solve a set of optical beam direction equations and/or to use pre-stored look-up table data referenced to the specific vehicle and mirror design and the driver's seat position to derive mirror adjustment control signals. These mirror adjustment control signals are then used to exactly, rather than approximately, change the mirror pitch and azimuth to compensate for differences in driver height and seat position in making the correct mirror alignment.

A further object of the second, more sophisticated, embodiment of this invention involving the integrated microcomputer (and of the first embodiment, provided an integrated microcomputer is employed) is to automatically determine the location of the driver's eyes for use in the alignment of a second exterior sideview mirror, typically the passenger's side mirror, and/or by other control systems (climate, seat level, radio settings, other mirrors, etc.). In the case of a subsequent seat realignment, the exterior sideview mirrors would, of course, be aligned to correspond to the final rather than initial seat position.

These and other objects of both embodiments and variations thereof are realized in a control system and method for aligning a first exterior sideview mirror of a vehicle to the eye position of a driver in a driver's seat to enable the driver to view rearward into an adjacent traffic lane to a first side of the vehicle in a first vehicle blind spot comprising the means for and steps of: emitting a light beam in a light beam direction from the sideview mirror; adjusting the light beam direction to be visible to the driver in the driver's seat; and aligning the first sideview mirror to reflect an image of the first vehicle blind spot to the driver's eyes on adjustment of the light beam direction to be visible to the driver in the driver's seat.

More specifically, the control system for aligning an exterior sideview mirror of a vehicle to the eye position of a driver in a driver's seat to enable the driver to view rearward into an adjacent traffic lane to the side of the vehicle in the vehicle blind spot in a correct alignment of the sideview mirror with respect to the driver's eyes comprises: a sideview mirror housing mounted to the vehicle; a sideview mirror having a reflective surface from which the image of the rearward view from the mirror housing is reflected; mirror mounting means for mounting the sideview mirror in the sideview mirror housing with the reflective surface facing outward and toward the rear of the vehicle for pivotal movement about at least one axis of rotation of the sideview mirror with respect to the mirror housing through a range of angles; a light source for emitting a light beam; light source mounting means for mounting the light source with respect to the sideview mirror housing to emit the light beam in a light beam direction; control means operable by the driver for adjusting the light beam direction to direct the light beam into the driver's eyes; and sideview mirror adjusting means responsive to the control means for pivotally moving the sideview mirror about the axis of rotation with respect to the mirror housing through an angle to orient the mirror reflective surface to reflect the image of the vehicle blind spot in proper alignment to the driver's eyes upon direction of the light beam into the driver's eyes. Preferably, the mirror has a selectively light transmissive region extending between the reflective surface and a back surface thereof, and the light source is mounted to emit the light beam through the selectively light transmissive region.

In the first embodiment, the light emitting source is preferably fixed in the mirror housing and aimed at the particular vehicle's blind spot or zone but reflected at an angle through the selectively light transmissive region by an auxiliary mirror attached for movement with the main sideview mirror. The sideview mirror alignment is accomplished manually or semi-automatically using the conventional mirror adjustment control or knob accessible by the driver from the interior of the vehicle. When the driver sees the beam of light, the sideview mirror is oriented correctly to reflect objects in the blind spot to the driver's eyes. The at least one axis of rotation provides azimuth angle adjustment of the sideview mirror.

Preferably, the system further includes means for mounting the sideview mirror in the sideview mirror housing with the reflective surface facing outward and toward the rear of the vehicle for pivotal movement about a horizontal axis of rotation of the sideview mirror with respect to the mirror housing through a pitch, or vertical, angle. In the first embodiment, means are provided to allow the driver to adjust the pitch angle to maximize the light beam intensity and thereby adjust for driver eye height variation and optimal view of the reflected blind spot image in the vertical direction.

In the second embodiment, the light emitting source is itself mounted for both horizontal and vertical adjustment, either manually or semi-automatically, using the existing mirror adjustment control or knob accessible by the driver from the interior of the vehicle. When the driver sees the beam of light, the pitch and azimuth angular orientation coordinates of the light emitting source are employed by an integrated microcomputer to derive mathematically, or draw from a look-up table, positional coordinates for the correct sideview mirror orientation to enable reflection of objects in the blind zone into the driver's eyes. The sideview mirror is then automatically moved to the calculated positional coordinates by servo motors responding to the azimuth and pitch error control signals generated by the microcomputer.

When employing a microcomputer in the first embodiment and as a matter of course in the second embodiment, the angular position coordinates of an aligned sideview mirror may be confirmed by position feedback pickoffs and stored in the on-board or vehicle microcomputer along with driver identification, interior rearview mirror position, seat position and other selected driver specific operating data. Then, whenever the driver enters his or her identification code, the seat and sideview mirror and other conditions may be checked and reset as necessary.

In both embodiments, the above described systems may be duplicated for both the driver's or left side and the passenger's or right side (in left side drive vehicles) exterior sideview mirrors.

Alternatively, in a further variation of the first embodiment (employing a microcomputer) and of the second embodiment, the adjustment of the optimal position coordinates of the left sideview mirror is automated. In both the first and second embodiments, since the passenger side vehicle blind spot or zone and the vehicle mirror and seating positions can be defined a'priori, the microcomputer can employ the final azimuth and pitch angle settings of the left sideview mirror determined from the pickoff signals to automatically derive the mirror adjustment signals to set the azimuth angle and pitch angle of the right sideview mirror. In this variation, the passenger's side exterior sideview mirror assembly need not include the light source, selectively transmissive region and, in the second embodiment, the light source gimbal drive and pickoffs, saving both expense and driver time in making the right sideview mirror adjustment.

The alignment aids of the present invention may therefore advantageously be employed with both vehicle sideview mirrors and coordinated with the setting of the interior rearview mirror. The additional components of the mirror assembly are relatively inexpensive and durable. The alignment system may be implemented into the existing vehicle microcomputer or a separate inexpensive on-board microcomputer. Through use of the alignment aid, accuracy in positioning of the sideview mirrors to reflect objects in the vehicle blind spot and driver appreciation of the proper mirror settings are greatly increased, hopefully resulting in lower frequency of accidents and injury.

BRIEF DESCRIPTION OF THE DRAWINGS

Other objects, advantages and features of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Introduction

A basic assumption of the first preferred alignment aid embodiment of the present invention is that the blind spot or blind zone for a given vehicle make and model, and given mirror style, is fixed and can be determined a'priori by the mirror manufacturer. This is an approximate, but very nearly correct assumption, as the actual blind spot location will be somewhat affected by the relative displacement in three dimensional space between a particular driver's eyes (to be more precise, the center point between the driver's left eye and right eye) and a suitable mirror reference point at which the driver is looking.

As is well known, a driver intuitively looks at the center of the mirror when aligning a mirror. Furthermore, the intersection of the mirror's pitch and azimuth rotation axes constitutes a true pivot point, which remains stationary with respect to the housing regardless of mirror adjustment. For most mirrors, the location of this pivot point can be considered to be at or very near the center of the sideview mirror's reflective surface. Hereafter, the location of the mirror reference point will be considered coincident with the center of the mirror and the mirror pivot point.

The nominal location (referenced to the center of the mirror) of the blind spot is a function of the width (end to end) and height (top to bottom) of the mirror, the known vehicle dimensions, the location where the mirror housing is mounted to the vehicle, the angular field of view that the interior rear view mirror covers (perhaps, more properly, does not cover), and the ranges of possible seat heights, seat back angle adjustments, fore-aft seat positions, and driver population heights. With these variables, appropriate mathematical formulae or algorithms may be used by the mirror manufacturer to determine, a'priori, a best estimate for a direction vector (unit vector) pointing from the mirror reference point to the nominal center of the blind spot. These mathematical formulae or algorithms are based on the simple laws of ray optics as applied to reflection from a mirror surface and are well known to those practicing in the art of automotive mirror design.

In the second embodiment of the invention, the exact blind spot direction vector (unit vector), rather than an approximate or nominal, direction vector, from the mirror reference point to the center of the blind spot is determined. In this embodiment, the vector direction of the driver's eyes (more precisely a center point located between the driver's eyes) focused on the mirror reference point is actually measured. The exactly correct, or more precisely, optimal, mirror orientations in pitch and azimuth for the particular driver's seated position in the vehicle can then be determined, and the mirror automatically driven to those angular positions.

The determination of the correct mirror pitch and azimuth positions involves calculations by an on-board or vehicle microcomputer using mathematical formulae and/or algorithms based on data stored in the form of look-up tables. Unlike the first embodiment these calculations must be performed during the actual mirror adjustment process as conducted by the vehicle driver rather than simply being used to determine the best estimate for the blind spot direction vector a'priori by the mirror manufacturer. These formulae or algorithms are again based on the laws of ray optics applied to mirror reflection and are well known to those practicing in the art of automotive mirror design.

First Preferred Embodiment

Returning to the first embodiment illustrated in FIGS. 1–5, the a'priori mathematical determination of the nominal blind spot direction with respect to the aforementioned mirror reference point on the mirror surface is used to mount a narrow wavelength light source emitting a light beam in a fixed relationship with respect to the vehicle left sideview mirror housing. When properly mounted in the mirror housing, the light source body references the vehicle longitudinal (fore-aft) axis, the vehicle's vertical axis perpendicular to the road surface, and a transverse horizontal vehicle axis, so that the light beam is launched at the blind spot in the azimuth direction.

Both the fixed azimuth and pitch launch directions are set during fabrication of the mirror assembly with respect to the known characteristics of the vehicle and driver population taken into account as described above. For most vehicle applications, the pitch launch direction will be close to horizontal as only small pitch angles, say within ±10 degrees of horizontal, are typically involved in mirror alignment.

The mirror reference point, the light source center, and the light beam pitch and azimuth launch directions are all fixed and may be employed in more complex variations of the first embodiment to partially automate the settings of the second sideview mirror and to locate the position of the driver's eyes for other purposes after the driver completes adjustment of the first sideview mirror.

Figure 1:
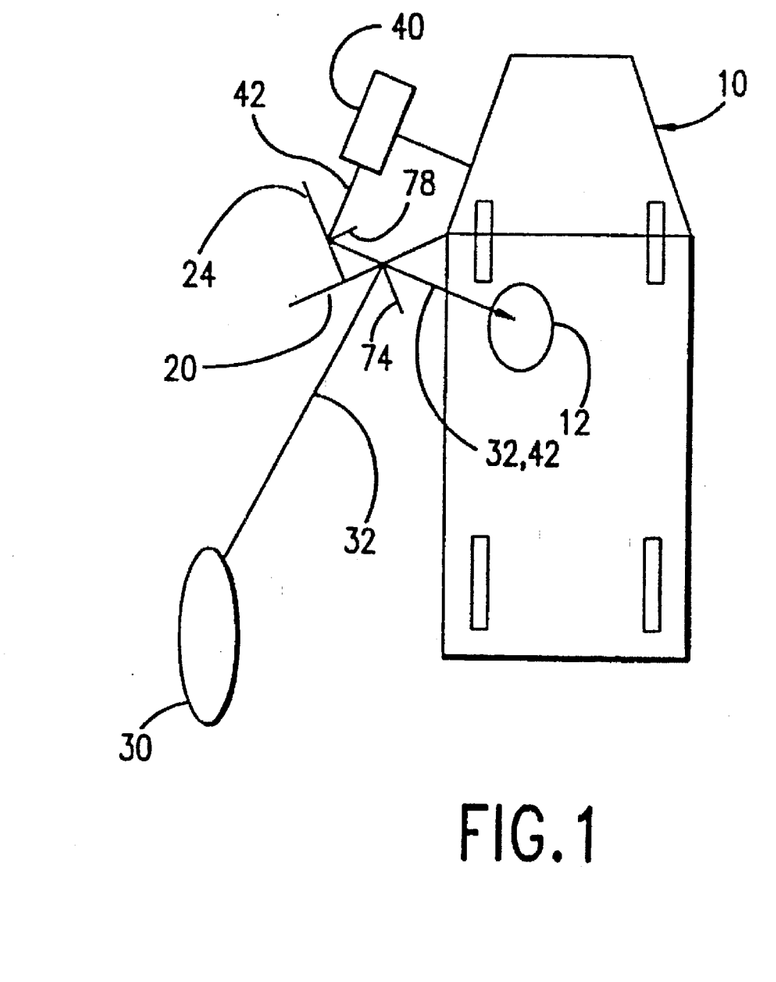
FIG. 1 is a top plan schematic view showing the basic geometry involved in the angular, horizontal azimuth adjustments of a side view vehicle mirror achieving a correct alignment that reflects light from objects in the vehicle blind spot in accordance with a first embodiment of the invention.
Figure 2:
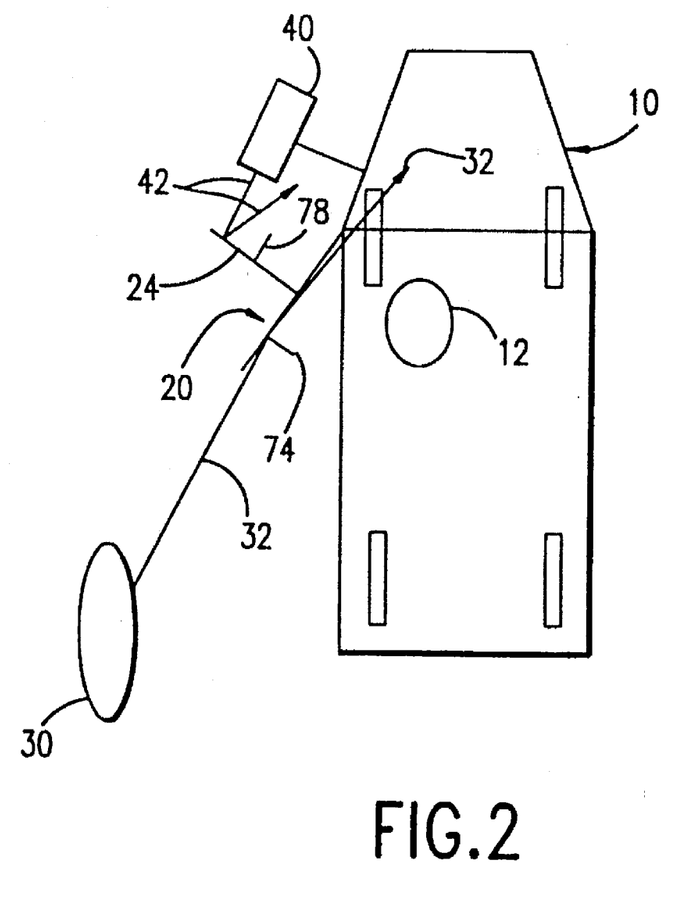
FIG. 2 is a two-dimensional plan view showing the sideview mirror incorrectly aligned so that the driver can not see objects in the vehicle's blind spot.
Figure 3:
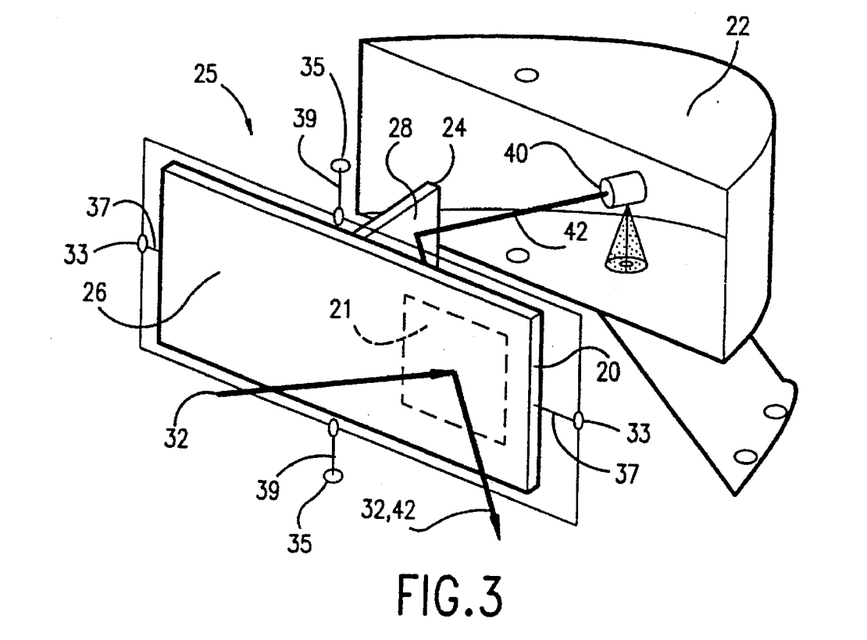
FIG. 3 is a simplified perspective illustration of a sideview mirror assembly used in the first preferred embodiment of the invention.
Figure 4:
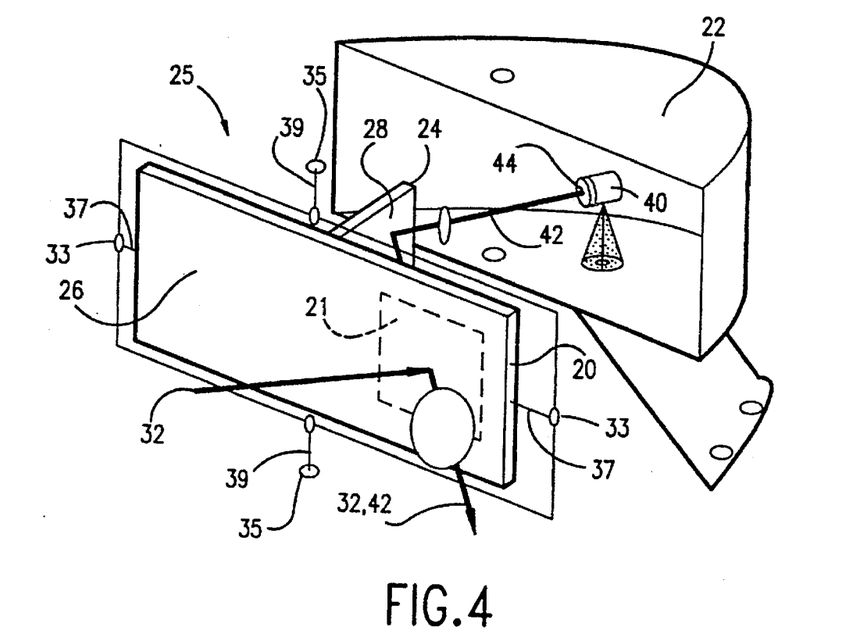
FIG. 4 is a simplified perspective illustration of the sideview mirror assembly used in the first preferred embodiment of the invention modified to depict one simple means of adjusting the LED beam to compensate for a variety of driver heights.
Figure 5:
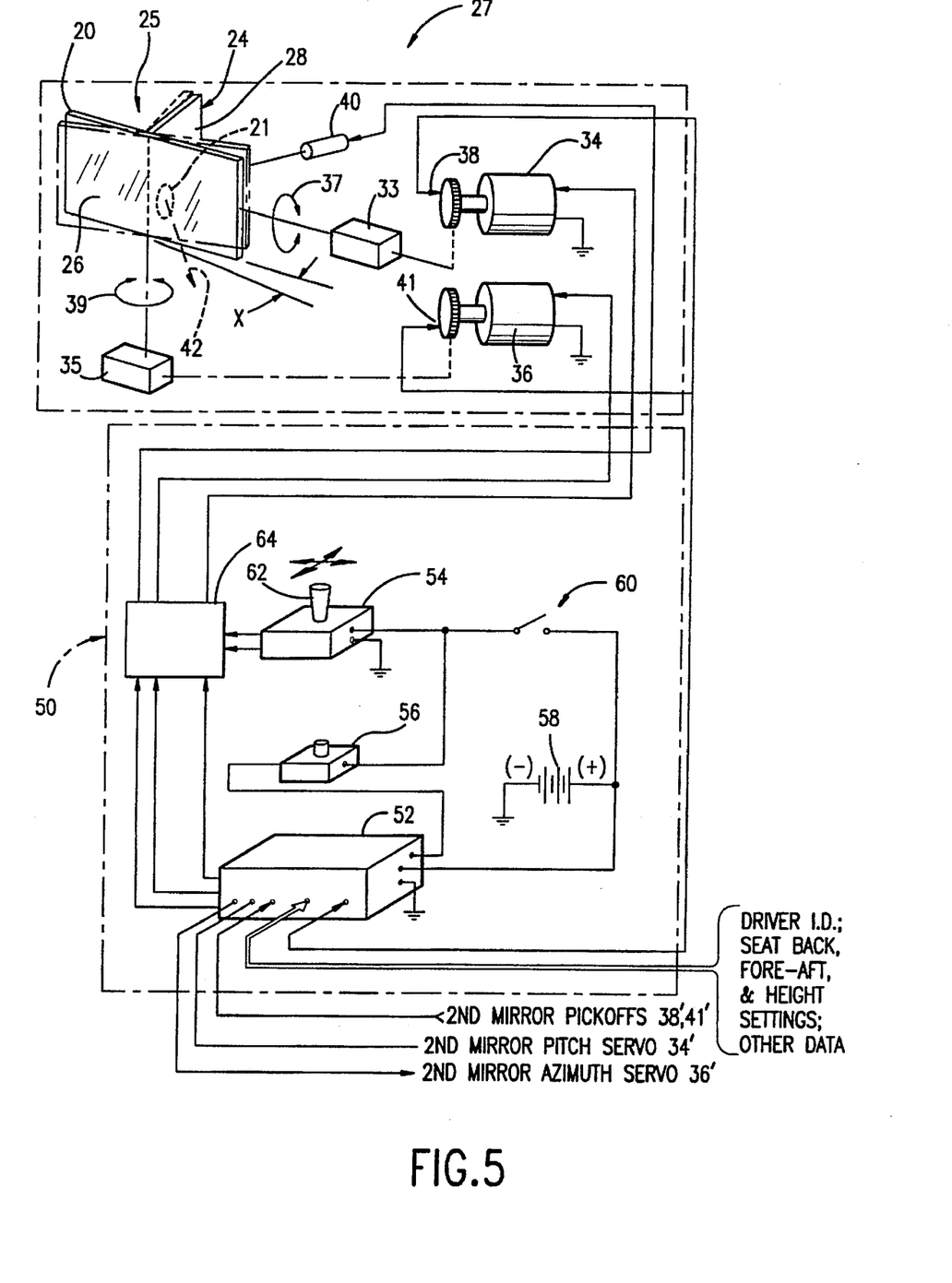
FIG. 5 is a system block diagram of a sideview mirror control system for the sideview mirror assembly of the first preferred embodiment of the invention, optionally including a microcomputer control system.

The light source is energized by the driver to provide the narrow wavelength light beam only when a mirror adjustment is to be made. FIGS. 1 and 2 are schematic illustrations of the concept and theory of the azimuth adjustment only. FIGS. 3 and 4 illustrate in simplified views the mechanical configuration of the improved mirror assembly of the first embodiment for providing the correct azimuth alignment and allowing a range of pitch adjustment to compensate for driver eye level height variation. FIG. 5 schematically illustrates the interconnection of the components of the mirror alignment aid system in the mirror housing and in the vehicle. FIG. 5 also allows for optional use of a microcomputer 52 in order to implement the more complex variations of the first embodiment.

Turning to FIG. 1, it shows a schematic, top plan view of the basic geometry involved in the first embodiment of the invention with respect to a vehicle 10 with a driver 12 sitting inside and a sideview mirror 20 in correct alignment to reflect the image of the blind spot 30 into the driver's eyes. A light beam emitter 40 is fixed to the mirror housing 22. The optical rays 32 to the driver's eyes from the blind spot 30 and the light beam 42 emitted by emitter 40 during the adjustment for a properly aligned sideview mirror 20 are depicted. Any variations in driver height and required small adjustments in vertical alignment (i.e. in mirror pitch) are not accounted for in FIG. 1 for simplicity of explanation.

As also shown in FIG. 3, the main sideview mirror 20 is attached to a much smaller, stubby "auxiliary" mirror 24 projecting at 90° from its back side to form a mirror subassembly 25. The main mirror 20 has a primary reflective front surface 26 facing outward of the mirror housing 22 (depicted with an outward extending mirror normal vector 74) and a second interior or back surface and may be of any conventional configuration and construction. The auxiliary mirror 24 (depicted with an outward extending normal unit vector 78, perpendicular to the mirror surface) is mounted to the back surface at right angles to the plane of reflective surface 26 near the center of the main mirror 20 and extends into the mirror housing 22. The auxiliary mirror 24 has a reflective mirror surface 28 at 90° to the main mirror surface 26. The auxiliary mirror 24 changes the azimuth direction of the light beam 42 by 90° when and only when the main mirror surface 26 is oriented properly in azimuth so as to reflect rays from objects in the blind spot into the driver's eyes. When the mirror 20 is properly aligned in azimuth, both rays 32 from the blind spot and the beam of light 42 are directed to the driver's eyes.

For the reflected light beam 42 to be transmitted through the main mirror 20 and seen by the driver 12, a small, central region 21 of the main mirror 20 is not totally reflective but is transparent, or at least semi-transparent, or otherwise selectively transmissive to the wavelength of the light beam 42 employed. The selectively transmissive region 21 may be readily achieved in a number of ways.

One method is by fabricating the main mirror 20 using properly selected layers of thin dielectric films which reflect all wavelengths except the selected wavelength of the light source 40. The only region 21 where the dielectric layer stack would actually have to permit the narrow band light beam to pass is shown in an exaggerated size in dashed lines in FIGS. 3 and 4. Therefore, the main mirror 20 would only have to be selectively transmissive to the wavelength of the light beam in the selectively transmissive region 21. The art of making such wavelength selective reflectors is well known to thin film coating specialists engaged in multilayer dielectric mirror fabrication as shown, for example, in the above-referenced '167 and '085 patents.

An alternate, perhaps simpler, method for achieving transmission of the light beam 42 through the selectively transmissive region 21 can be employed by varying the silver metal deposition process. In this method, the small region 21 (typically a few mm on a side) would be left not silvered or only partially silvered. Such techniques are well known to those skilled in the art of metal film mirror fabrication. In this case, the not-silvered, or partially silvered, light transmissive region 21 is transmissive of all light wavelengths or "white" light. However, in practice, only the light emitted by the light source 40 would be present, when energized, within the mirror housing 22 and visible to the driver through the region 21 when the main and auxiliary mirrors 24 and 20 are properly aligned. At other times, the selectively transmissive region 21 would appear as a small black dot on the otherwise reflective mirror surface 26. For this reason, using this or similar methods of fabrication of a region that would pass a wider band or all wavelengths of visible light still results in a selectively transmissive region 21, for all practical purposes. The expression "selectively light transmissive region" is therefore intended to include any such fabrication technique and resulting structure and technical equivalents thereto. Similarly, the expression "selective wavelength" is intended to include narrow bandwiths and full "white" light depending on the construction.

Use of a small, low power Light Emitting Diode (LED) for the mirror housing light beam emitter 40 is preferred due to the ease of aiming, mounting and powering it inside the mirror housing 22 and behind the mirror's back surface. For example a Panasonic Corp. LN28RAL (US) high brightness LED may be used to emit a bright red light beam 42 that appears as a spot on the main mirror surface 26 reference point in the selectively light transmissive region 21 when the reflected light beam 42 strikes the driver's eyes.

Alternatively, the light beam emitter 40 could be a small lamp, or a visible low intensity laser diode (with the beam 42 suitably spread rather than collimated). In this regard, while a narrow bandwidth is preferable, wide band (white) light could even be employed, as long as it could be seen in daylight by the driver 12. In addition, the light beam emitter 40 could be remote from the sideview mirror housing 22, with the light "piped" to the mirror housing 22 mounting position via a fiber optic cable. In the latter case, the end of the fiber optic cable, suitably cleaved and lensed, would constitute a virtual light source within the mirror housing 22 cavity. In any case, the spot of light seen at the mirror surface 26 in selectively light transmissive region 21 should be bright enough to be seen in daylight and distinctive of the reflected image while not so bright as to damage the driver's eyes.

With proper alignment of the exterior sideview mirror 22 by the vehicle driver 12, central rays 32 from the blind spot image area 30 reflected from mirror surface 26 and the reflected alignment LED light beam 42 transmitted through the selectively transmissive region 21 are collinear when directed to the driver's eyes, as shown in FIG. 1. The driver 12 will see both the bright spot of the narrow bandwidth light beam 42 as well as the reflected blind spot image area 30 (this collinear condition is not exact when driver height and fore-aft seat position is considered in the first embodiment, but is still approximately correct, as will be discussed shortly). On the other hand, when the mirror 20 is not properly aligned, the collinear condition is no longer even approximately valid.

When the main mirror 20 is misaligned, the vehicle driver 12 no longer sees the alignment light beam 42, or at least the radiation intensity entering the driver's eyes is much reduced from that occurring under correct mirror alignment. FIG. 2 is again a two-dimensional plan view as in FIG. 1, but showing the effect of incorrect alignment of the driver's side or left sideview mirror 20. Due to the incorrect alignment, the driver 12 would not be viewing traffic in the vehicle's blind spot if he/she looked into the mirror 20. The LED light beam 42 is reflected away and would not be seen by the driver 12 in this incorrect position.

FIG. 3 shows a simplified mechanical assembly drawing of this first preferred embodiment of the opto-electronic aid for alignment of automotive exterior sideview mirrors. As noted, the LED 40 is fixed to the stationary mirror housing 22, and the light beam 42 points into the blind spot area 30 (as stated earlier really a conical shaped volume). The reflection of the light beam 42 afforded by the small auxiliary mirror 24 through the selectively light transmissive region 21 (shown dotted) of the main mirror 20 is depicted. The main mirror 20 is supported for rotation about the horizontal or pitch and vertical or azimuth mirror axes 37 and 39.

In regard to all of the described embodiments, it should be noted that, depending on the mirror design and mirror mounting system used, the pitch and azimuth mirror axes 37 and 39 may not be truly horizontal and vertical, respectively, as measured against the force of gravity, nor even be exactly orthogonal to one another. Rather, horizontal and vertical as used herein must be considered as nominal directions. However, whatever their exact orientation with respect to each other and gravity, the axes 37 and 39 are constants in any given mirror subassembly 25 and vehicle.

For illustration clarity, the sizes of the mirror alignment aid components are exaggerated in FIGS. 1–3. The reflection of light beam 42 is actually much closer to the "root" (the junction line between the two mirrors 20 and 24). Furthermore, the root and the selectively light transmissive region 21 are displaced in FIGS. 1–3 for ease of illustration. In practice, they are virtually coincident with the previously described mirror reference point on the front surface of the mirror at or very near the center of the mirror 20 and at or near the intersection of the pitch and azimuth mirror axes 37 and 39. Therefore, in reference to FIG. 3, under a condition of proper alignment, the light beam 42 reflects from the reflective mirror surface 28 near its "root" with the main mirror 20 and transmitted through the selectively light transmissive region 21 of the main mirror 20 and through the vehicle 10 window into the vehicle interior. When the driver sees the transmitted light beam 42, the mirror reflective surface 26 is properly aligned to reflect the rays 32 of the vehicle blind spot 30 on that side of the vehicle.

It should be noted that the LED light beam 42 is, in practice, not the collimated pencil beam shown for simplicity in FIG. 3 but rather diverges into a radiation cone. Thus, reasonably small, random motions of the driver's head may occur, while the main LED beam 42 will still be maximized in the driver's eyes when the mirror 20 is properly aligned.

Examining FIGS. 1–3 further, it should be noted that the LED 40 should point at the blind spot 30 in azimuth. On the other hand, the LED 40 should not actually point at the blind spot 30 in pitch. Rather the LED 40, or other light source, beam 42 should be angled upwards in pitch to the same amount (in degrees) that a nominal driver would want his or her view of the blind spot in the center of the mirror to be angled downwards.

To understand this, consider the following. The driver's eyes are usually higher than the horizontal pitch axis 37. The blind spot 30 is usually slightly below the level of the mirror subassembly 25, i.e. closer to the surface of the road. This is also usually below the driver's eye level. Thus, in order for the LED light beam 42 to be approximately collinear with the central ray 32 from the blind spot 30, as seen by the driver 12, the LED 42 must actually be angled a small amount upwards corresponding to the nominal small upward angle of the direction vector (unit vector) 66 pointing from the mirror reference point to the location point of a typical driver's eyes 80. Once identified mathematically or empirically, this nominal upwards pitch adjustment of LED 40 can be fixed for a given mirror style and vehicle model.

When angled slightly upward, the LED light beam 42 will continue to rise into the driver's eyes upon reflection from the auxiliary mirror 24 through the selectively transmissive region 21. This path is similar to the path in which the light rays 32 from the image in the blind spot 30 are deviated upwards into the driver's eyes by the action of the main mirror reflective surface 26. In the event that the mirror is high mounted on the particular vehicle so that a typical driver's eyes are nominally below the mirror center, the LED beam 42 would, of course, have to be angled down a similar amount rather than angled up.

From the geometry depicted in FIGS. 1–3, it should also be noted that this first preferred embodiment is quite insensitive to driver fore-aft seat placement. In particular, the fixed LED 40 always launches its light beam 42 toward a nominal blind spot. Regardless of where the driver is sitting, objects in this nominal blind spot will be reflected into the driver's eyes after the mirror is aligned using the LED 40. As noted, the actual blind spot location and hence the optimal azimuth orientation of the mirror will depend somewhat on the driver's fore-aft seating position as shown next. However, to a first approximation this shift in actual blind spot location with driver fore-aft seat position is very small. The first embodiment always keeps the driver's eyes looking at the nominal blind spot as is shown next.

In the case of an initial fixed mirror orientation, a forward movement of the seat from some nominal location, with no further mirror adjustment, causes objects laterally further out from and more towards the front of the vehicle to be imaged in the center of the mirror. Similarly, again with the mirror adjustment fixed for a centrally positioned driver, a seat movement backwards from this nominal driver position will cause objects laterally closer to but more behind the vehicle to be imaged in the center of the mirror. Neither of these positions are optimal, since in the former case the object is already in or is about to enter the driver's peripheral vision while in the latter case an object behind the vehicle will normally still be visible in the interior rearview mirror and, anyway, does not present a side impact danger at that time. In either case, if the driver then initiates operation of the first embodiment of the mirror blind spot alignment aid to adjust mirror azimuth angle, the region imaged in the mirror center can be restored to reflect the true blind spot.

Turning now to fine adjustments in pitch made for driver height or selected seat height position, this usually requires a slight rotation of the main mirror 22 about its nominally horizontal pitch axis 37 from a condition of being exactly vertical. In this first preferred embodiment, the central rays 42 and 32 of the LED 40 and blind spot 30 will not quite be collinear when they enter the driver's eyes at the extremes in height/seat position. What remains to consider, then, is how different driver height/seat height positions, and hence eye levels, may be accommodated in this first preferred embodiment with minimum reduction in azimuth alignment accuracy.

As noted above, depending on the amount of driver eye level variation from the design norm for the particular vehicle, the main mirror 20 will have to be tilted plus or minus a few degrees from its nominal pitch orientation. The following modification to the first embodiment will work well with mirror designs in which the nominal pitch angle is near 0° or true vertical.

FIG. 4 shows this modification involving simply diverging the LED light beam 42 to encompass the variety of driver eye levels typically encountered. It is only necessary to insure that the LED light beam 42 spreads adequately in the vertical direction so that both tall and short drivers, even in the extreme seat positions, will see the beam approximately maximized when the mirror 20 is properly aligned in the azimuth direction.

Non-uniform divergence of the reflected light beam 42 is frequently already associated with many LEDs 40. In this case, it may only be necessary to align the LED 40 on its mount so that the greater inherent light beam divergence is along the vertical direction. If still more vertical divergence is necessary, a simple anamorphic or flat Fresnel or miniature glass rod lens (so-called SELFOC lens) 44 can be placed on the end of the LED 40 to produce the desired somewhat elliptical beam spot pattern. Typically, a 5°–10° divergence cone would be appropriate. FIG. 4 shows such a lens 44 mounted on the LED 40 to properly shape the reflected light beam 42 into the depicted elliptic pattern as seen within the driver's compartment.

In this first embodiment of the present invention, the LED light beam 42 launch angle is not changed as the driver 12 tilts the main mirror 20 to compensate for variations in driver height. Hence, the degree of collinearity of the LED beam 42 and true blind spot image rays 32 is again reduced somewhat just as with driver fore-aft seat adjustment. Since only a small range of vertical mirror 22 pitch tilt should encompass all driver heights, this slight reduction in exact collinearity of the LED and blind spot central rays should be quite tolerable when additional spreading of the LED beam 42 in the vertical direction is introduced as described with respect to FIG. 4 and as necessary. The vertical spread of the light beam 42 makes it easier for the driver 12 to see the light beam as the mirror azimuth change is being made. Then, the driver 12 can still maximize the intensity of the LED beam 42 in his or her eyes by operating the mirror pitch control and can be assured that any residual misalignment from driver eye height effects will be very small.

It should also be noted in this regard that most drivers are able to easily visually determine the pitch adjustment that provides the optimum view rearward from the reflected blind spot image 30. The pitch adjustment is not as critical, and once the azimuth adjustment is completed, the driver is still free to adjust the pitch, while driving the vehicle, to an optimum angle. If pitch adjustment alone is initiated, the LED 40 may be either powered or not powered on detection of movement of the joystick control knob.

All of the FIGS. 1–4 are schematic and exaggerated in certain details to illustrate and ease the understanding of the principles of the invention. The actual size of the auxiliary mirror 24 can be quite small, on the order of 0.5" wide by 0.5" high by 0.1" thick. It should also be noted that the auxiliary mirror 24 used in the first preferred embodiment does not have to be a physical mirror. Instead, mirror 24 could be a 90° corner cube reflector, suitably mounted on the back side of main mirror 20. Alternately, mirror 24 could be a mechanically ruled or holographically formed diffraction grating placed on the back surface of the main mirror 20, where the appropriate diffraction order would redirect the light beam 42 by 90° and then through the selectively light transmissive region 21.

The particular joystick control, suspension of the mirror subassembly 25 within the mirror housing 22 that allows adjustments in azimuth and pitch, and the mechanism employed to make the adjustments are not shown in FIGS. 1–4. This is for ease of illustrating the principle components and operation of the first embodiment which may be implemented in its simplest form in a manually adjustable sideview mirror assembly. It should be understood that a ball swivel joint, azimuth and pitch gimbals or any of the known, remote control electro-mechanical mirror adjustment systems, including those shown in any of the above-referenced patents, could be employed to provide a suitable suspension of the mirror subassembly 25 and adjustment mechanism for providing the adjustment of the mirror pitch and azimuth. For example, in a non-motorized "baseline" system, the conventional mechanical joystick control can be manipulated until the driver sees the LED beam 42 as described above. The baseline system may be duplicated to provide the alignment aid of the present invention of both the right or passenger's side and the left or driver's side exterior sideview mirrors.

Turning to FIG. 5, it depicts a sideview mirror alignment aid system for left and/or right sideview mirrors similar to that shown in the above-referenced '835 patent that comprehensively illustrates one form of the components that would be used in the baseline system described above. FIG. 5 also illustrates the components of progressively more complex, automated sideview mirror adjustment systems described as follows.

In the comprehensive system of FIG. 5, the mirror assembly 27 is depicted in relation to the alignment aid control assembly 50 including a joystick control 54 and optionally including a vehicle or on-board integrated microcomputer 52 and input/output signal lines. The mirror assembly 27 includes the mirror subassembly 25 supported on mirror pitch and azimuth gimbals 33 and 35. The mirror adjustment in relation to the LED 40, fixed in position in the mirror housing 22, is effected by mirror pitch and gimbal servo motors 34 and 36. The mirror pitch and azimuth gimbals 33 and 35 allow the rotation of the mirror subassembly 25 about the nominally horizontal and vertical mirror axes 37 and 39, respectively, in response to pitch and azimuth servo motor drive signals.

The mirror assembly 27 of the system depicted in FIG. 5 may be duplicated for both the right and left exterior sideview mirrors. Separate joystick controls 54 or a sequential operation of the joystick control 54 may be provided to control the pitch and azimuth alignment of each mirror subassembly 25 in the manner described below. The comprehensive alignment aid control assembly 50 depicted in FIG. 5 preferably comprises the joystick control 54 and a button 56 powered by the vehicle battery 58 when ignition auxiliary power switch 60 is closed and optionally includes the switching network 64, button 56 and microcomputer 52 for use in the more complex variations described below. The mirror adjustment joystick control 54 in the baseline system serves to directly provide illumination power to the LED 40 and directly adjusts the mirror 20 in tilt or pitch and azimuth as in adjustment of an ordinary exterior sideview mirror. In the depicted comprehensive embodiment of FIG. 5, the joystick control 54 provides LED power and servo motor drive signals to the LED 40 and servo motors 34 and 36 directly (bypassing depicted switching network 64) during an adjustment. As described above, the adjustment may alternatively be accomplished via a cable extending from the joystick control 54 to a mechanical linkage for manually adjusting a known ball joint mirror pitch and azimuth support mechanism mounted in the mirror housing 22.

In one of the simplest uses of the vehicle or on-board microcomputer 52, it may be interfaced through the button 56 and switching network 64 as shown in FIG. 5 to provide simple on-off control and memory functions. In this regard, the mirror gimbals 33 and 35 or servo motors 34 and 36 also include position pickoffs 38 and 41, respectively, for providing position data to the microcomputer 52 for storage optionally in relation to seat position and other vehicle operating data for the particular driver in a manner described in greater detail below. The pickoffs 38, 41 may be rotary optical encoders, preferably using absolute encoder disks of the type disclosed, for example, in the article "Principles of Rotary Optical Encoders", appearing in SENSORS, April 1993, pp 10–18.

Particularly in original equipment manufacture applications, the vehicle or on-board microcomputer 52 may be used to memorize the pickoff signal values after a driver has once aligned each mirror and then generate the pitch and azimuth mirror alignment signals for the sideview mirror(s) on subsequent occasions in a "smart" mode of operation. The object here is to avoid requiring the driver to repeatedly realign the side view mirror(s) after having already done this once before, even if another person has driven the car since then and has changed the mirror alignment. Apart from the pickoffs 38, 41 and microcomputer 52 (for alignment data storage), all that is required is a suitable identification code, card or key for each driver and an entry system interfacing with the microcomputer 52. The microcomputer 52 may also be operational to receive seat position data and other vehicle data that is personalized to the ID code of the driver as shown in FIG. 5.

In this smart or intelligent mode of operation, the system operates as follows. Assuming either no prior storage of mirror position data or that the driver wishes to make a mirror readjustment, when the driver is seated in the vehicle, he or she turns the ignition power switch 60 to the auxiliary or full on position and depresses or turns the button 56 to generate a reset signal. The switching network 64 connects the mirror positioning servo motors 34 and 36 to the driver's joystick control 54 during the initial mirror adjustment. The microcomputer 52 turns on the LED 40 in response to the reset signal control, and the driver continues to adjust the control knob 62 thereby varying the mirror azimuth and pitch angles until the LED light beam 42 is sighted. When the driver is satisfied and again depresses button 56, the microcomputer 52 stores the gimbal position signals. The microcomputer 52 may request the driver to input his/her personal identification code and may also then store the associated seat position data and other driver related data described below. This procedure is followed for both the driver's and passenger's side exterior sideview mirrors.

Assuming smart mode operation, the next time that the driver uses the vehicle, he/she simply inputs their identification code, and the microcomputer 52 automatically energizes the mirror azimuth and pitch servo motors 36 and 34, respectively, through the switching network 64, to effect the alignment, if necessary. The stored alignment values are compared to the values fed back by the pickoffs 38, 41 during the alignment check. Thus, each mirror 20, 20' can be automatically adjusted to the driver's previously completed alignment settings. This system contemplates the simultaneous seat adjustment in response to the identification code to ensure that the driver is properly seated. If the seat positions are changed, then the system contemplates alerting the driver to make a new adjustment of the sideview mirror alignments.

Another variation of the first embodiment (that also requires microcomputer 52 and that may be implemented with or without the smart mode) allows for elimination of the LED 40, selectively light transmissive region 21, and auxiliary mirror 24 in the passenger side mirror. Instead of using the light beam 42, the passenger's side exterior sideview mirror would be aligned based on the results of the driver's side sideview mirror alignment after a series of approximately correct computations using the pickoff pitch and azimuth setting signals and certain assumptions. This additional variation of the first embodiment will be discussed after the second embodiment is described and in reference to FIG. 8, since the required computations involve the same equations as are solved in the second embodiment.

To reiterate, in simpler, after market, replacement applications or in original equipment manufacture where cost reduction is paramount, the smart mode of operation and/or the additional variation may be absent. In this case, the button 56, switching network 64, pickoffs 38 and 41, and the connections to the vehicle microcomputer 52 (or the on-board microcomputer 52) depicted in FIG. 5 may be eliminated. The joystick control 54 can be connected to the LED 40 (of each mirror assembly) to energize it whenever the control knob 62 is manually moved by the driver. A further cost reduction can be made by eliminating the mirror servo motors 34, 36 altogether and using a manual mirror positioning system, such as a simple ball joint swivel or one of the manually adjustable mirror suspension systems described in the above-referenced patents. In a motorized mirror control system, the joystick control 54 can be connected directly to the mirror servo motors 34, 36 (rather than through the switch network 64) to operate the servo motors 34 and 35 to make the mirror alignment adjustment for each mirror described in detail above.

Second Preferred Embodiment

The second, somewhat more sophisticated, embodiment of the opto-electronic mirror alignment aid for reduction of blind spot effects in one or both of the exterior sideview mirrors will now be described with reference to FIGS. 6–8. In this second embodiment, the driver's manipulation of the joystick control 54 now directly adjusts the LED 40 (or other light source) light beam 42 direction, not the main mirror 20 position. In the system illustrated in FIG. 7, when the driver indicates that he/she sees the narrow wavelength LED beam 42 by depressing button 56, the microcomputer 52 solves a set of mathematical equations and/or performs a table lookup operation and uses the resulting position data to drive the mirror servo motors 34 and 36. Servo motors 34, 36 set the azimuth and pitch angles of the mirror 20 in the correct alignment to reflect objects in the vehicle blind spot 30 into the driver's eyes. In this embodiment, the compensations for driver eye level variations and fore-aft seat placement can both be exact. Thus, the driver 10 can be assured that no further optimization of the mirror 20 pitch alignment obtained from this embodiment is necessary.

Figure 6:
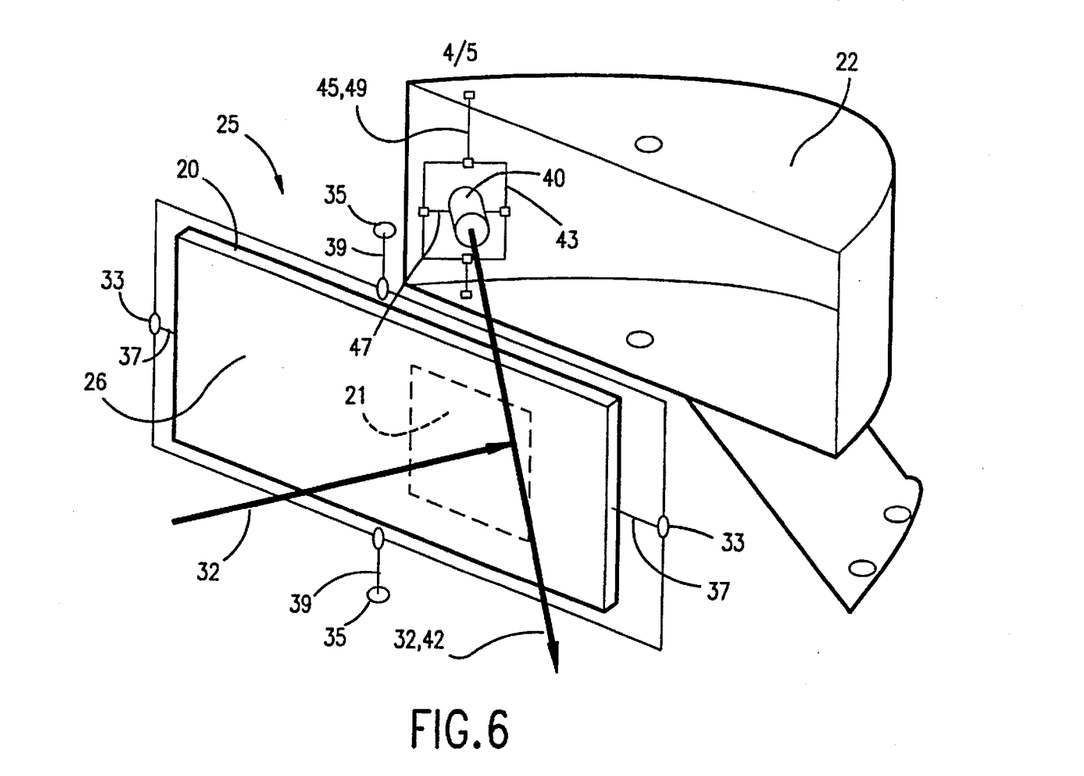
FIG. 6 shows a simplified assembly diagram of a second, more sophisticated, embodiment of an opto-electronic aid for aligning an exterior sideview mirror to the proper pitch and azimuth orientation to image vehicles in an adjacent traffic lane.

FIG. 6 shows a simplified mirror subassembly 25 of the mechanical components of this second preferred embodiment of the invention, wherein the LED 40 is mounted on a set of LED pitch and azimuth gimbals 43 and 45, respectively, rather than directly mounted on the mirror housing 22. Note here that the LED beam 42 is directed toward the driver through the selectively light transmissive region 21 and not reflected off an auxiliary mirror. The latter is not necessary and would only complicate the mathematics involved in this second embodiment.

The outer, LED azimuth gimbal 45 permits rotations of the LED 40, and hence LED light beam 42, about a vertical axis 49 to adjust for driver fore-aft seat position. The inner, LED pitch gimbal 43 allows for the LED 40 to be tilted up or down with respect to the driver's eye level about a horizontal axis 47.

In this second preferred embodiment, the alignment process is therefore accomplished by first directing the narrow wavelength LED beam 42 through the sideview mirror's selectively transmissive region 21 from the backside and toward the driver. This requires suitable fabrication of the mirror reflective layers in the region shown in dashed lines in FIG. 6 in the same manner as described above. For ease of illustration, the selectively transmissive region 21 is shown off center from the mirror reference point in FIGS. 6 and 7.

Figure 7:
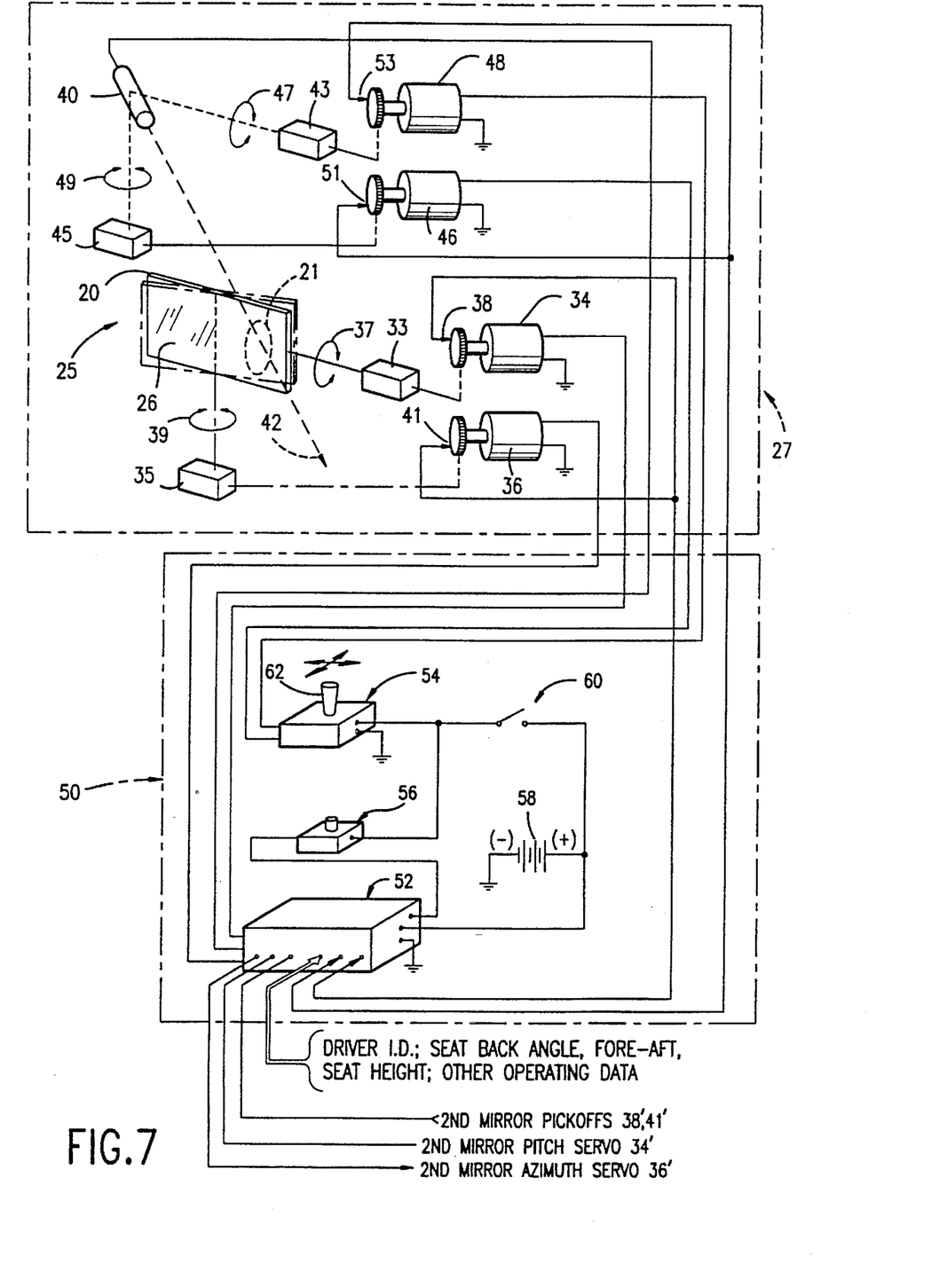
FIG. 7 is a simplified system diagram of a microcomputer-based mirror adjustment mechanism in which the second embodiment of the present invention may be implemented.

Turning to FIG. 7, the main mirror 20 is supported on the two mirror alignment gimbals 33, 35 coupled to the mirror servo motors 34, 36. The LED alignment servo motors 44, 46 track the driver's manual adjustment of control knob 62 to maximize the LED beam intensity at the driver's eyes. The LED angle measurement encoders or pickoffs 48, 51 on the LED servo motor gear drives provide LED pitch and azimuth position feedback signals to the microcomputer 52. The mirror alignment servo motors 34, 36 respond to the microcomputer derived azimuth and pitch mirror drive signals to drive the two mirror gimbals 33, 35 and perform the actual alignment of the main mirror 20 with the blind spot.

In particular, the mirror alignment servo motors 34, 36 operate under microcomputer 52 control to align the main mirror 20 to the proper pitch and azimuth orientation determined from the final alignment of the LED light beam 42 axis with the driver's eyes. This includes introducing any shift in the blind spot direction with variations in driver height or fore-aft position of the driver's eyes. The angle measurement encoders or pickoffs 38, 41 are also placed on the gear drive to provide feedback position signals to the microcomputer 52. The feedback control signals provide the microcomputer 52 with the positional information needed to determine the direction and amount of azimuth and pitch adjustment of the main mirror 20 required to achieve optimal mirror alignment with the blind spot 30.

The automatic mirror positioning system of FIG. 7 constitutes a closed loop angular positioning servo control system. The LED beam 42 direction is adjusted by the driver via the joystick control 54 as described above. Once the driver sees the LED beam 42, he or she maximizes its intensity by fine tune operating the sideview mirror control knob 62 and then depresses the button 56.

The button switch 56, is typically on the same mirror control joystick 54. This "pickle" button feature is well known in the art of video game hardware design. When the button switch 56 is pressed, the microcomputer 52 removes power from the LED 40 to extinguish the light beam 42. The LED gimbal pitch and azimuth angles, $\Theta_L$ and $\Phi_L$ respectively, are then read out via the miniature angle resolvers or pickoffs 48, 51.

The LED gimbal pitch and azimuth angles $\Theta_L$ and $\Phi_L$ are simply the Euler angles, relating a transformation of coordinates between a mirror housing fixed Cartesian coordinate system establishing the mirror vertical axis 39 and the mirror horizontal axis 37 and a second Cartesian coordinate system establishing the LED vertical axis 49 and the LED horizontal axis 47. Given these two Euler angles, the microcomputer 52 is able to compute the three direction cosines ($p_d$, $q_d$, $r_d$) which define a unit vector 66 pointing from a suitable reference origin point on the LED 40, typically at the pivot center of the LED 40, towards the driver's eyes 80. (The corresponding displacement, or distance, vector between the driver's side mirror 20 and the driver's eyes 80, shown in FIG. 8, is simply the linear extension of unit vector 66 and is identified by the same number, 66, in FIG. 8.) Each component of the three element, driver direction cosine vector 66 is the cosine of the angle between the unit vector 66 toward the driver's eyes and the corresponding mirror housing fixed reference axis, i.e. the $X_v$, $Y_v$, $Z_v$ vehicle axes using Cartesian axes.

The nominal direction cosines of the blind spot axis are known a'priori for a given mirror mount placement and vehicle model. Furthermore, any variations due to changes in driver eye height or fore-aft position from nominal can be included in a suitable mathematical model in the vehicle microcomputer 52. Let us denote these three direction cosines to the blind spot by the vector [$p_b$, $q_b$, $r_b$]. Again, these direction cosines define a unit vector 70, this time pointing from a vehicle fixed reference or origin point (typically at or very near the center of the mirror) down the axis of the conical volume defining the blind spot 30 and toward the blind spot. (The corresponding displacement, or distance, vector between the driver's side mirror 20 and blind spot 30 shown in FIG. 8 is simply the linear extension of the unit vector 70 and is identified by the same number, 70, in FIG. 8.) Any required depression angle to account for the fact that a driver usually wishes to see the road surface some distance behind a vehicle centered in the mirror is included in the unit vector 70.

It is not strictly necessary that the driver direction reference point on the LED 40 be coincident with the blind spot direction reference point on the mirror 20, although the coincidence simplifies the computations if a mathematical solution is being attempted. Typically, the pivot center of the LED 40 will be much closer to the center and/or azimuth rotation axis of the mirror 20 than shown in FIGS. 6 and 7, so the above assumption will most often be valid. It is necessary, however, that the above two sets of direction cosines, i.e. the two unit vectors, be measured with respect to the same vehicle fixed coordinate system, and that any vector displacement between the two reference points on the mirror front surface through which these direction cosine vectors pass be accounted for.

The microcomputer 52 then computes or, more simply looks up in a stored look-up table, the required direction cosines associated with the mirror normal vector when the mirror is correctly positioned. This mirror normal vector constitutes yet another unit vector. Let us denote the mirror normal unit vector 74 (hereafter called the mirror normal) by the ordered tuple [$p_m$, $q_m$, $r_m$]. Being a vector normal to a plane, the mirror normal 74 may be translated freely anywhere over the mirror surface. In particular, it may be placed at the same common origin used for the driver and blind spot direction vectors.

The required three conditions or constraints that allow the three unknown quantities $p_m$, $q_m$, $r_m$ to be derived are: (1) that the mirror normal 74 must be in the plane of the incident central ray from the blind spot (known a'priori) and the reflected central ray 32 heading towards the driver's eyes (collinear with the LED pointing direction); (2) that the mirror normal 74 must bisect the angle formed between the incident and reflected central rays 32, and (3) that the mirror normal 74 has unit length. The first two constraints arise from the properties of plane mirrors and guarantee that the blind spot image will be directed exactly at the driver's eyes, regardless of his or her eye level and fore-aft seat position. The third constraint is a simple property of all unit vectors, viz, given two direction cosines of a unit vector, the third is automatically defined.

After [$p_m$, $q_m$, $r_m$] are solved for, the corresponding mirror azimuth and pitch Euler angles, $\Theta_M$ and $\Phi_M$, respectively, for the correct mirror position are computed. The fact that only two, rather than three, such angles result is consistent with the fact that rotating a mirror about its normal axis does not change the direction that incident rays are reflected. These angle computations are all straightforward, although nonlinear because of the trigonometric functions involved.

As the mathematics involved are well known to those skilled in optical ray tracing and computer analysis of lens and mirror systems, no detailed equations need to be given here.

In a typical implementation of this second preferred embodiment, no equations would actually be solved during sideview mirror alignment. Rather, for all possible observed LED pitch and azimuth gimbal angles, $\Theta_L$ and $\Phi_L$, the corresponding required mirror gimbal angles, $\Theta_M$ and $\Phi_M$ of the correct mirror position for the particular vehicle would be derived a'priori by the mirror manufacturer and stored in a look-up table in ROM associated with the microcomputer 52. Thereafter, the required mirror gimbal angles, $\Theta_M$ and $\Phi_M$ for the observed LED pitch and azimuth gimbal angles, $\Theta_L$ and $\Phi_L$, would be simply looked up in the ROM look-up table by the microcomputer 52 once the pickle switch 56 is closed by the driver.

Next, the mirror 20 would be automatically servoed, first about the azimuth (outer) gimbal 35, and second about the pitch (inner) gimbal 33 by azimuth and pitch mirror drive signals generated by the microcomputer 52. The above order assumes a certain convention in defining the Euler angle transformations. A different convention might result in the servoing being conducted first about pitch and then about azimuth. The resultant final mirror 20 orientation would be identical in either case, although the commanded $\Theta_M$ and $\Phi_M$ values would be different.

Regardless of the Euler angle convention adopted, appropriate mirror gimbal angle encoders or pickoffs 38, 41 are employed so that a continuous feedback of the actual mirror angular orientation is returned to the microcomputer 52 during the servo operation. This will insure that the mirror servo motors 34, 36 are run in the correct directions and are stopped when correct alignment is obtained. At completion, the blind spot image is reflected directly into the driver's eyes.

A suitable indicator, such as a green LED, may be momentarily energized to signal to the driver that a condition of proper alignment has been achieved. Another refinement to the second embodiment would be the incorporation of a panel warning light similar to the "door ajar" warning to indicate a malfunction in the alignment aid.

Turning to the adjustment of both the driver's and passenger's sideview mirrors, several variations on the second embodiment are possible. In the simplest baseline version of the second embodiment, each mirror assembly 27 would be configured in the manner of FIGS. 6 and 7 and would have its own LED source that the driver orients so that he or she sees a maximum light spot intensity in each sideview mirror 20, 20'. The microcomputer 52 may be shared with both mirror assemblies and simply computes the mirror alignments twice as the driver signals completion of the manipulation of the control knob for each mirror and then automatically adjusts each sideview mirror 20, 20' to the computed alignments via the appropriate mirror servo motors.

Just as with the first embodiment, a smart mode, most useful for high end OEM manufacturers, can be implemented wherein the driver's preferred pitch and azimuth angle settings for both mirrors are automatically remembered once an alignment is initially performed. A suitable driver ID code would have to be entered into the vehicle microcomputer in this case for the automatic vehicle customizing to occur. In addition, the driver's seat fore-aft, height and seat back adjustments are preferably also memorized in microcomputer 52 and employed in resetting the mirror adjustment on entry of the driver ID code. Again, the driver may be alerted to changes in memorized seat positions inconsistent with the memorized mirror alignment data.

Derivation of Driver's Actual Eye Location

Figure 8:
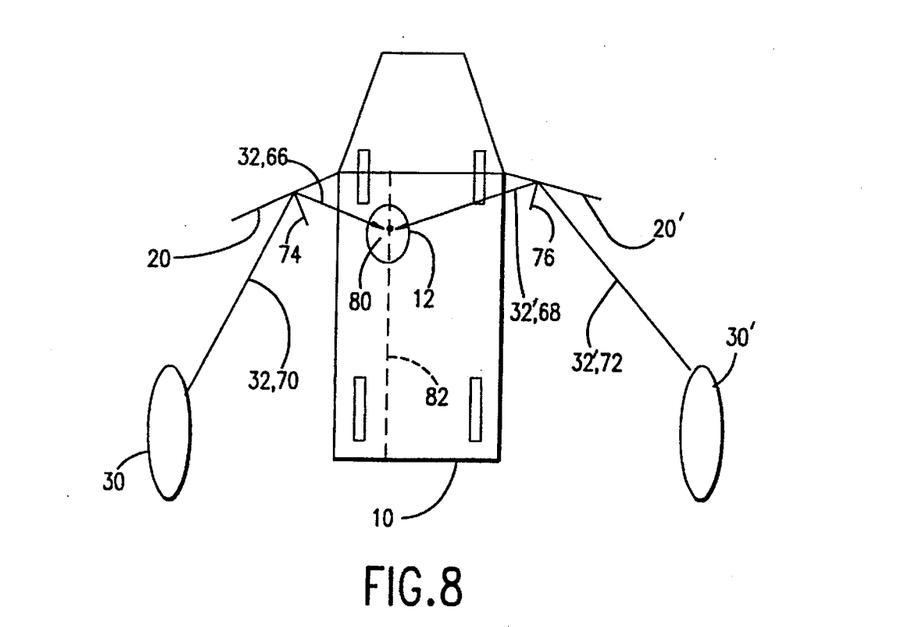
FIG. 8 is a simplified top plan schematic view of a correctly aligned mirror system in either the first or second embodiment showing both a left hand and a right hand mirror affixed to the vehicle and how the two lines of position from the mirrors to the driver's eyes determine the location of the driver's eyes.

FIG. 8 schematically depicts both left and right sideview mirrors 20 and 20' correctly aligned to the driver's eyes 80 to view the blind spots 30 and 30', respectively, in accordance with either of the above embodiments. For each mirror 20, 20', the components of the mirror subassembly 25 and assembly 27, such as the mirror housing 22, LED sources 40, gimbals, servo motors, etc., of FIGS. 1–7, are not depicted in FIG. 8 for simplicity. Only the schematic symbols 20, 20' for the two mirrors along with the appropriate left and right mirror normals 74 and 76, and the associated distance, or displacement, vectors 66, 68, 70, and 72 are depicted. The displacement vectors are simply the linear extensions of the corresponding unit vectors bearing the same identification numbers, as noted earlier.

From FIG. 8, it can be seen that the two distance, or displacement, vectors 66, 68, intersect between the driver's eyes 80. This intersection point defines the exact current location of the driver in the car seat along the fore-aft driver's seat adjustment plane 82, not just a direction to his/her eyes 80. The two distance vectors 66 and 68 represent the straight line extensions of the unit vectors represented by the two direction cosine tuples $[p_d, q_d, r_d]$ and $[p_d, q_d, r_d]$40 from their known origins (at or very near the mirror reference points). By definition, at correct mirror alignment, these two distance vectors 66, 68 must intersect at the midpoint between the driver's left eye and right eye.

In the context of FIGS. 1–7 described previously, the distance vector 66 lies along the common direction of the reflected light rays 32 from the left side blind spot 30 and the transmitted light beam 42 with respect to the left mirror normal 74 (a unit vector). The distance vector 68 similarly lies along the common direction of the reflected light rays 32' from the right side blind spot 30' and the transmitted light beam 42' (if an LED 40 is actually present in the right sideview mirror subassembly) with respect to the right mirror normal 76.

Two variations for the determination of the position of the driver's eyes 80 in a fore-aft seat adjustment plane 82 in three-dimensional space after adjustment of one or both of the exterior sideview mirrors 20, 20' can be observed from FIG. 8 and the following discussion.

In the first variation for determining the driver's eye location, the right sideview mirror subassembly includes an LED source 40 emitting light beam 42'. The two light beams 42 and 42' are both adjusted by the driver to point at his or her eyes 80 as described above. Then, as also noted above, the point where the two distance vectors intersect is the location of the driver's eyes, 80.

The same variation for determining the driver's eye location is also possible with the first embodiment provided the microcomputer 52 and pickoffs 38, 41 are employed. To understand this, it must be recalled from the above description that the position Cartesian coordinates for the mirror reference points and pitch and azimuth axes of the mirrors 20, 20' and the associated LED sources 40, 40', the fore-aft driver's seat adjustment plane 82, and the blind spot lines of position 70, 72 are known a'priori for the specific vehicle and stored in memory in microcomputer 52. Hence, by measuring the final azimuth and pitch alignment of the mirror 20, the driver side mirror normal 74 direction cosine tuple $[p_m, q_m, r_m]$ can be derived in the first embodiment, as well as the second embodiment. In turn, the unit vector 66 pointing from the left sideview mirror to the driver's eyes may be solved for mathematically in either embodiment. Similarly, the passenger side mirror normal 76 direction cosine tuple $[p_m, q_m, r_m]'$ for the mirror 20' can also be derived from the feedback signals from the mirror servo motor pickoffs 38', 41', processed by the microcomputer 52. From the two driver's eye unit vectors 66, 68, the actual position of the driver's eyes 80 in the fore-aft seat plane 82 may be determined in this first variation of the first embodiment, just as the position may be determined in the second embodiment as described above.

It should be noted in this first variation for determining the driver's eye position that the knowledge of the position driver's eyes 80 is not actually used to align either mirror. Rather, regardless of whether the first or second embodiment is being implemented, the mirrors are aligned independently of one another, and the position of the driver's eyes 80 is located afterwards. The eye position coordinates are then simply made available to be employed by other vehicle control systems (climate, seat level, radio settings, other mirrors, etc.).

In the second variation for determining the driver's eye location, one light beam (typically the right mirror light beam 42') is not actually present. Here only one light source and beam, typically the left or driver's side mirror beam 42, and the corresponding distance vector 66, is necessary for the location of the driver's eyes 80 to be computed. This is because the midpoint of the eyes 80 should also lie in the vertical fore-aft seat plane 82 passing through the center of the driver's seat and directed fore-aft in the vehicle 10 if the driver is properly seated behind the steering wheel. The seat plane 82 and mirror subassembly coordinates with respect to the vehicle 10 are known. The extended unit vector from mirror 20 (or 20') to the driver's eyes 80 constitutes a distance vector 66 (or 68) in 3-D space. Since the distance vector 66 (or 68) can intersect plane 82 in at most one point, one can again make use of basic geometry and solve for the position of the eyes 80 where the line and plane intersect. This point is the midpoint location of the driver's eyes 80.

In this second variation, one would preferably use the distance vector 66 from the left hand (driver's side) mirror 20, since this would be the shorter vector and would yield the most accuracy in determining the eye midpoint 80. Therefore, it is possible to eliminate the LED 40 and associated LED gimbals 43, 45, servo motors 44, 46 and LED pickoffs 48, 51 in the right hand or passenger's side exterior sideview mirror subassembly altogether. Once the location of the driver's eye is determined, the microcomputer 52 can solve for the distance vector 68 to the right hand mirror 20' rather than actually have to read out the direction of light beam 42'. This second variation for determining the driver's eye location leads to the simplification in the mirror subassembly discussed below.

A Related Simplification Variation of the Mirror Subassembly for a Two Mirror Alignment System In a system of either the first or second embodiment employing both the driver's and passenger side exterior sideview mirror, it is desirable to simplify the mirror assemblies to save cost and simplify the alignment procedure when the system admits of use of the microcomputer 52. For example, it is preferred that only the driver's side mirror be equipped with the LED 40, auxiliary mirror 24 and associated light transmissive region 21 (of the first embodiment) and the LED pitch and azimuth adjustment means (of the second embodiment). The alignment data from the setting of the pitch and azimuth of the left or driver's sideview mirror is used to automatically set the pitch and azimuth of the right or passenger's sideview mirror.

Referring again to FIG. 8, from the final alignment of the mirror 20, the left hand mirror normal 74 represented as a tuple $[p_m, q_m, r_m]$ is derived as described above in regard to the second embodiment. In a like manner, the components of the mirror normal 74 represented as a tuple $[p_m, q_m, r_m]$ can also be derived in the first embodiment employing the microcomputer 52 and pickoffs 38, 41. Then, from the stored body of positional data identified above, the right hand sideview mirror normal 76, represented as a tuple $[p_m, q_m, r_m]'$, may be determined for proper alignment of the mirror 20' with respect to the driver's eyes 80 in the fore-aft seat plane 82. More particularly, first consider the second embodiment of the invention for which the simplification manifests itself most directly. There, knowledge of the location of the fixed reference point for mirror 20 in 3-D space along with knowledge of the direction cosines corresponding to distance vector 66 from mirror 20 to the driver's eyes 80 allows the location of the driver's eyes to be determined in 3-D space as explained for the second variation earlier. This is because the midpoint of the eyes 80 should also lie in the vertical fore-aft seat plane 82 passing through the center of the driver's seat and directed fore-aft in the vehicle 10 if the driver is properly seated behind the steering wheel. In turn, knowledge of the location of point 80 and the also fixed reference point for mirror 20' allows distance vector 68 from 20' to 80 to be computed. Given distance vector 68, one can readily compute the direction cosine tuple $[p_d, q_d, r_d]'$ of the corresponding direction vector. Next, since the location 30' of the right hand blind spot is known a'priori, so is the direction cosine tuple $[p_b, q_b, r_b]'$ defining the displacement vector 72.

Finally, given the direction cosines of displacement vectors 68 and 72 one may solve for the direction cosines of the right hand mirror normal 76 and the corresponding Euler azimuth and pitch angles. This last step uses the same set of equations as employed with the second embodiment.

Servo positioning of the right hand sideview mirror 20' (using mirror pickoffs 38, 41 and pitch and azimuth servo motors 34 and 36 mounted on gimbals 33 and 35 in the passenger's sideview mirror subassembly) can then proceed under control of the microcomputer 52 with no further driver intervention. This is the situation assumed in FIG. 7 where the pitch and azimuth drive signals for the right sideview mirror servo motors are generated by the microcomputer 52 after the left hand, or driver's, exterior mirror adjustment is completed.

In the same fashion, the more complex version of the first embodiment system depicted in FIG. 5 may be employed to eliminate the need for a light source in the passenger side mirror 20' and for any driver actions to align this mirror once the driver side sideview mirror 20 is aligned. Rather, it is possible to derive the approximately correct azimuth and pitch angle positions of the right sideview mirror 20' when the driver signals completion of the manual adjustment of the left sideview mirror 20 to the microcomputer 52. As in the case for the related simplification variation of the second embodiment, this can be done without requiring any light source be present in the right sideview mirror subassembly, thereby saving components and reducing manufacturing costs of the system. This variation may also be demonstrated in reference to FIGS. 5 and 8.

The mirror servo pickoffs 38 and 41 allow the final pitch and azimuth orientation angles of the left sideview mirror 20 to be quantified by the microcomputer 52. a'priori and are stored in the microcomputer 52. In turn, these define the mirror unit normal 74. Now, in the more complex form of the first embodiment, the approximate direction cosines of a vector from the mirror 20 to the blind spot 30 are assumed to be known a'priori and are stored in the microcomputer. These direction cosines define a unit vector collinear with the vector direction 70 in FIG. 8. Given the determination of the unit vector collinear with distance vector 70 and of the mirror normal 74 (also a unit vector), a third unit vector collinear with the distance vector 66 and extending from the reference point on the mirror surface toward the driver's eyes 80 can be derived. This solution makes use of the same basic mirror laws as employed in the second embodiment and described earlier.

Derivation of the unit vector collinear with distance vector 66 along with knowledge of the stored Cartesian coordinates in three dimensional space of the reference point for the left hand mirror 20 and knowledge of the driver's seat center plane 82 allows the approximate location 80 of the driver's eyes to be determined. Next knowledge of the stored Cartesian coordinates of the right hand sideview mirror's reference point and the just completed derivation of the coordinates of the driver's eyes 80 may be employed to derive the distance vector 68 from the right hand sideview mirror 20'. Upon derivation of the distance vector 68, knowledge of the stored a'priori direction cosines corresponding to distance vector 72 from the right hand mirror 20' to the nominal right side blind spot 30' may be employed to derive the direction cosines of the mirror normal vector 76. The corresponding pitch and azimuth orientation angles for the right hand mirror can be computed, again using the same mathematics as for the second embodiment. Finally, the mirror azimuth and pitch drive signals are calculated and the servo motors driven to achieve the correct alignment of the passenger's side sideview mirror 20'.

Final Comments

In the above description and the following claims, no requirements will be made on the microcomputer as to whether it is a general purpose or special purpose unit and whether it is integrated in the mirror hardware or not. The microcomputer may be a general purpose vehicle microcomputer, used for other functions such as computing gas milage computation or climate control, or a special purpose processor or computer, strictly dedicated to the mirror alignment functions described in this application. The general adjectives "vehicle", "on-board" and/or "integrated" covers all locations and types of microprocessors or microcomputers used by the mirror blind spot reduction technology described herein. If an integrated microcomputer is employed in either the first or second embodiments, it may be located in one or both of the mirror housings and included by the mirror manufacturer as part of the delivered unit.

In the description and illustration of the preferred embodiments and variations thereof, it has been assumed that the LED or other light source is positioned within the mirror housing 22 behind the movable mirror subassembly, thereby requiring the selectively transmissive region 21. The present invention contemplates the possibility that the light source 40 may be otherwise positioned and supported fixedly or for movement in pitch and azimuth with respect to the mirror assembly 27 while performing the same functions as described above.

While a number of preferred embodiments of the invention and variations thereof have been described in detail, other modifications and methods of using or implementing the same will be apparent to those of skill in the art. Accordingly, it should be understood that various applications, modifications, and substitutions may be made of equivalents without departing from the spirit of the invention or the scope of the claims.

PARTS LIST FOR FIGS. 1–8 vehicle 10
driver 12
sideview main mirrors 20, 20'
selectively transmissive region 21
mirror housing 22
auxiliary mirror 24
mirror subassembly 25
primary reflective mirror surface 26
mirror assembly 27
secondary reflective mirror surface 28
blind spots 30, 30'
reflected blind spot light rays 32, 32'
mirror pitch gimbal 33
mirror pitch servo motor 34
mirror azimuth gimbal 35
mirror azimuth servo motor 36
horizontal or pitch mirror axis 37
mirror pitch gimbal position pickoff 38
vertical or azimuth mirror axis 39
narrow wavelength light beam emitter or LED 40
mirror azimuth gimbal position pickoff 41
narrow wavelength light beams 42, 42'
LED pitch gimbal 43
LED pitch servo motor 44
LED azimuth gimbal 45
LED azimuth servo motor 46
horizontal LED axis 47
LED pitch gimbal position pickoff 48
vertical LED axis 49
alignment aid control assembly 50
LED azimuth gimbal position pickoff 51
vehicle microcomputer 52
joystick control 54
button 56
vehicle battery 58
ignition auxiliary power switch 60
control knob 62
switching network 64
left sideview mirror to driver unit or distance vector 66
right sideview mirror to driver unit or distance vector 68
left sideview mirror to blind spot distance vector 70
right sideview mirror to blind spot distance vector 72
left sideview mirror normal vector (unit vector) 74
right sideview mirror normal vector (unit vector) 76
auxiliary mirror normal vector (unit vector) 78
driver's eye position 80
fore-aft driver's seat plane 82

I claim:

1. A method of aligning a first exterior sideview mirror located at a first fixed reference point on a vehicle to the eye position of a driver in a driver's seat generally positioned in a predetermined fore-aft seat plane relative to the axis of the vehicle to enable the driver to view rearward into an adjacent traffic lane along a first side of the vehicle including a first vehicle blind spot comprising the steps of:

emitting a light beam from a predetermined location of the vehicle in a light beam direction;

adjusting the light beam direction to an angle of adjustment so that the light beam is visible to the driver in the driver's seat in the fore-aft seat plane;

measuring the angle of adjustment of the light beam and providing a measured angle of adjustment;

deriving a first mirror positioning signal from the measured angle of adjustment and in correlation with the predetermined fore-aft seat plane, the first mirror reference point, and the first vehicle blind spot; and employing the first mirror positioning signal to align the first sideview mirror to reflect an image of the first vehicle blind spot to the driver's eyes.

2. The method of claim 1 for aligning a second exterior sideview mirror located at a second fixed reference point on said vehicle to the eye position of the driver in the driver's seat to enable the driver to view rearward into an adjacent traffic lane along a second side of the vehicle including a second vehicle blind spot comprising the further steps of:

deriving a second mirror positioning signal from the measured angle of adjustment, the fore-aft seat plane, the second fixed reference point, and the second vehicle blind spot; and employing the second mirror positioning signal to align the second sideview mirror to reflect an image of the second vehicle blind spot to the driver's eyes.

3. The method of claim 1 for aligning a second exterior sideview mirror located at a second fixed reference point on said vehicle to the eye position of the driver in the driver's seat to enable the driver to view rearward into an adjacent traffic lane along a second side of the vehicle including a second vehicle blind spot comprising the further steps of:

emitting a second light beam from a second predetermined location of the vehicle in a second light beam direction;

adjusting the second light beam direction to an angle of adjustment so that the second light beam is visible to the driver in the driver's seat;

measuring the angle of adjustment of the second light beam and providing a second measured angle of adjustment;

deriving a second mirror positioning signal from said second measured angle of adjustment of said second light beam, said second fixed reference point, and said second vehicle blind spot; and employing the second mirror positioning signal to align the second sideview mirror to reflect an image of the second vehicle blind spot to the driver's eyes.

4. The method of claim 3 further comprising the steps of:

deriving the position of the driver's eyes from the first and second measured angles of adjustment of said first and second light beams on adjustment of the first and second light beams to be visible to the driver in the driver's seat.

5. Apparatus for aligning first exterior sideview mirror located at a first fixed reference point on a vehicle to the eye position of a driver in a driver's seat generally positioned in a predetermined fore-aft seat plane relative to the axis of the vehicle to enable the driver to view rearward into an adjacent traffic lane along a first side of the vehicle including a first vehicle blind spot comprising:

a light source for emitting a light beam from a predetermined location of the vehicle in a light beam direction;

means for adjusting the light beam direction to an angle of adjustment so that the light beam is visible to the driver in the driver's seat in the fore-aft seat plane;

means for measuring the angle of adjustment and providing a measured angle of adjustment;

means for deriving a first mirror positioning signal from the measured angle of adjustment and in relation to the predetermined fore-aft seat plane, the first fixed reference point and the first vehicle blind spot; and means responsive to the first mirror positioning signal for aligning the first sideview mirror to reflect an image of the first vehicle blind spot to the driver's eyes.

6. The apparatus of claim 5 for aligning a second exterior sideview mirror located at a second fixed reference point on said vehicle to the eye position of the driver in the driver's seat to enable the driver to view rearward into an adjacent traffic lane along a second side of the vehicle including a second vehicle blind spot further comprising:

means for deriving a second mirror positioning signal from the measured angle of adjustment, the fore-aft seat plane, the second fixed reference point, and the second vehicle blind spot; and means responsive to the second mirror positioning signal for aligning the second sideview mirror to reflect an image of the second vehicle blind spot to the driver's eyes.

7. The apparatus of claim 5 for aligning a second exterior sideview mirror located at a second fixed reference point on said vehicle to the eye position of the driver in the driver's seat to enable the driver to view rearward into an adjacent traffic lane along a second side of the vehicle including a second vehicle blind spot further comprising:

means for emitting a second light beam from a second location of the vehicle in a second light beam direction;

means for adjusting the second light beam direction to an angle of adjustment so that the second light beam is visible to the driver in the driver's seat;

means for measuring the angle of adjustment of the second light beam and providing a second measured angle of adjustment;

means for deriving a second mirror positioning signal from said second measured angle of adjustment of said second light beam, said second fixed reference point, and said second vehicle blind spot; and means responsive to the second mirror positioning signal for aligning the second sideview mirror to reflect an image of the second vehicle blind spot to the driver's eyes.

8. The apparatus of claim 7, further comprising:

means for deriving the position of the driver's eyes from the first and second measured angles of adjustment of said first and second light beams on adjustment of the first and second light beams to be visible to the driver in the driver's seat.

* * * * *